Sept. 11, 1962 H. O. GEORGS 3,053,758
METHOD OF STARTING UP A HYDROCARBON TREATING PROCESS
Filed Nov. 27, 1959
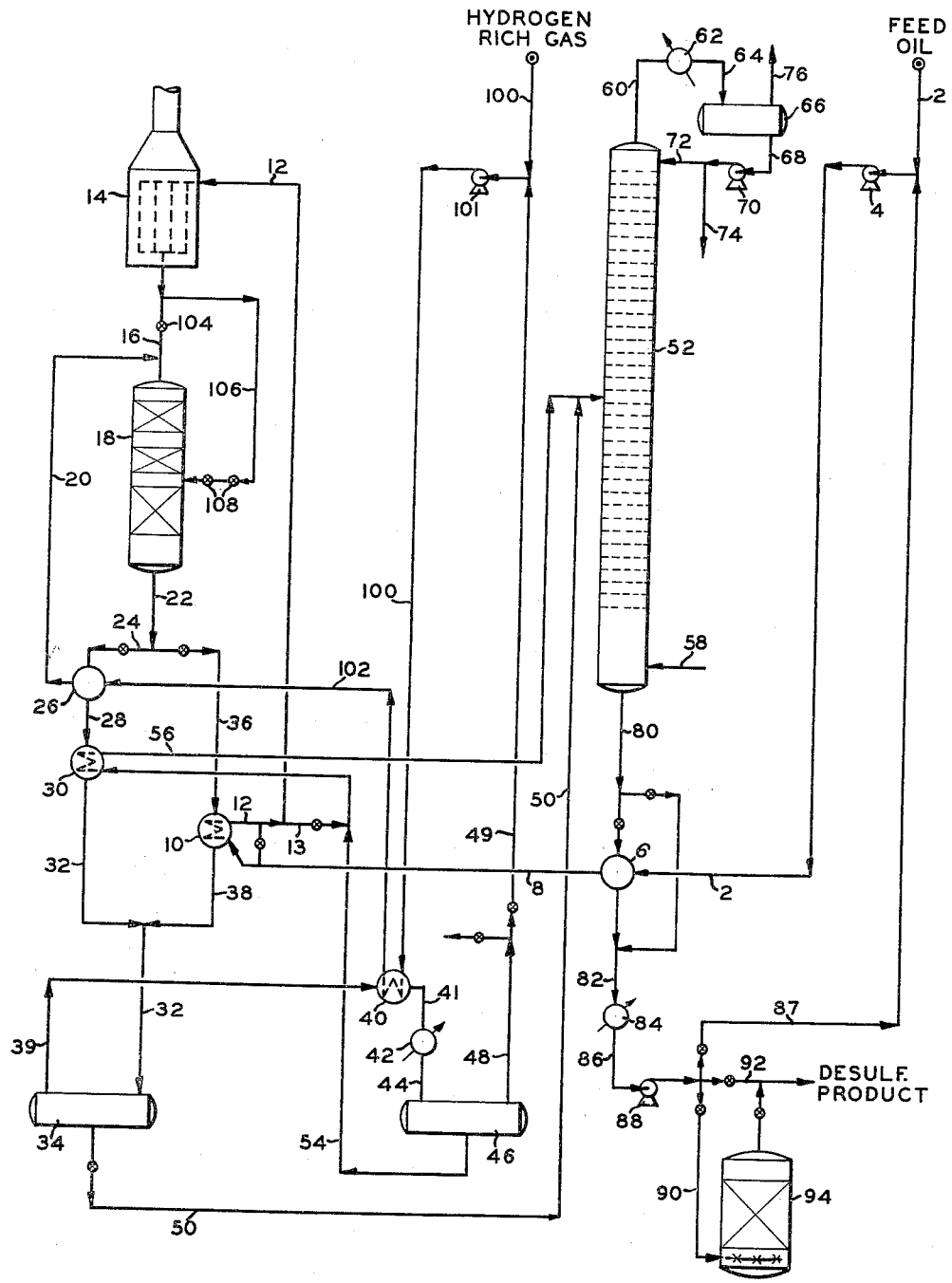
INVENTOR.
HENRY O. GEORGS
BY
ATTORNEY
AGENT

United States Patent Office

3,053,758
Patented Sept. 11, 1962

3,053,758
METHOD OF STARTING UP A HYDROCARBON TREATING PROCESS
Henry O. Georgs, Arlington, N.J., assignor to The M. W. Kellogg Company, Jersey City, N.J., a corporation of Delaware
Filed Nov. 27, 1959, Ser. No. 855,578
16 Claims. (Cl. 208—216)

This invention relates to an improved method for treating hydrocarbons in the presence of a gaseous material and more particularly is directed to the method of starting up a process for treating hydrocarbon feed materials in the presence of a hydrogen-rich gas stream.

It has been a practice heretofore in processes related to treating hydrocarbon feed materials with hydrogen or a hydrogen-rich gas stream in the presence of a catalytic material to employ a gaseous stream such as a hydrogen-rich stream or an inert gaseous material to initiate start up of the process. In such prior processes the gaseous stream is heated in the furnace normally employed for the hydrocarbon feed, and after the desired temperatures in the system are attained, relatively cold oil is introduced to the furnace thereby causing a thermal shock in the system, as well as upsetting the established temperature balance. Furthermore, after flow of oil is established through the furnace, the flow of gaseous material is then stopped and another upset in the heat balance of the system is experienced which further extends the time to achieve desired start-up including desired temperature balance in the system. This method of operation has had many disadvantages associated therewith involving safety, requiring costly furnace equipment, corrosion problems were encountered and more important thermal shock was experienced in these systems. Furthermore, an undesirable bump or surge in the system was experienced when switching the oil feed to the furnace in place of the hydrogen stream. Therefore, it is proposed herein to present an improved method of start-up which will substantially eliminate the problems encountered in such prior art methods.

It is an object of this invention to provide an improved method of starting up a process wherein a hydrocarbon feed material is treated in the presence of a catalytic material with a reactive gaseous material.

It is another object of this invention to provide an improved method of starting up a desulfurizing process.

Other objects and advantages will become apparent from the following discussion.

By the present invention, a method of starting up a process is provided for the treatment of a hydrocarbon reactant with a hydrogen-rich gas stream in the presence of a catalytic material which includes generally the steps of (1) establishing flow with a relatively cool hydrogen-rich gas stream by cyclically circulating the hydrogen-rich gas stream through the system including the reactor, a portion of the recovery section including the serially connected separator drums and back to the reactor without passing through the oil feed preheat furnace under conditions to establish sufficient pressure in the system to assure flow of hydrocarbon feed material through the system, (2) thereafter initiating flow of hydrocarbon feed through the oil feed preheat furnace without the addition of heat thereto, the reactor, the liquid recovery section until desired liquid levels are established and recycling oil feed from the stripper back to the furnace, (3) after establishing desired cyclic flow of the hydrogen-rich gas stream and the hydrocarbon feed under ambient conditions through the system, the hydrocarbon feed furnace is then fired under conditions to effect partial heating of the feed, and (4) continuing the cyclic circulation of the hydrogen-rich gas stream and the hydrocarbon feed stream through the system as outlined above while incrementally increasing the temperature of the system with the oil feed preheat furnace until desired operating temperature and pressure conditions are attained, and thereafter stopping the recycle of liquid product from the stripper tower to the fresh feed conduit to the product furnace.

Generally, during starting up and after establishing flow with the hydrogen-stream as outlined above, the temperature of the system will be gradually raised and at a rate in the range of from about 40 to about 60° F. per hour and not more, preferably less than about 100° F. per hour. Accordingly, the hydrocarbon feed flow rate during start up should be maintained below designed flow rate conditions, that is below about 70 percent of design flow rate and preferably not more than about 50 percent of design flow rate.

By starting up the process in accordance with the improved method outlined above, the process may be brought on stream without encountering the problems of prior art systems including thermal shock to the equipment, as well as damage to the catalyst. Furthermore, it was found that when starting up in accordance with the improved method outlined above, the process could be brought on stream in a much shorter period of time without overloading the preheat furnace usually encountered in the prior art systems.

By "cold stream," "relatively cold stream" and similar expressions, I mean the hydrocarbon feed and hydrogen-rich gas streams will be at a temperature as received, for example, from storage or a reforming process and most usually will be at ambient temperature conditions without being subjected to intentional additional heating to an elevated temperature in a furnace or by other means. These expressions are also intended to cover the condition of the hydrogen-rich gas stream recovered from the compressor and which may be partially heated by the heat of compression, but is intended to exclude other methods or means for supplying additional heat to the hydrogen-rich gas stream.

The improved method of start-up in accordance with this invention is adaptable to a wide variety of processes relating to the treatment of hydrocarbon feed materials with hydrogen under a variety of reaction conditions of space velocity, temperature and pressure conditions. In any of these applications it most usually is desirable to maintain a relatively high ratio of hydrogen to hydrocarbon reactant and the improved method of this invention facilitates maintaining this desired condition particularly at start-up. This invention has application to operations involving the conversion of a hydrocarbon in the presence of a hydrogen-containing gas such as for example, aromatization, hydrogenation, reforming, hydroforming, isomerization, cracking under hydrogen pressure, desulfurization, etc. Among the various processes which can utilize the method of the present invention to a particular advantage is found in the desulfurization of hydrocarbon feed materials. While it is true that certain desulfurization processes such as autofining are operated under conditions to effect a net production of hydrogen, nevertheless, the method of this invention is adaptable thereto and is readily adaptable to desulfurization systems employing a plurality of reactors.

In practicing the desulfurization process to which the present invention is specifically applied, the hydrocarbon feed to be contacted with hydrogen may be maintained in either a liquid, vapor or mixed liquid-vapor state under contacting or treating conditions. In the case wherein a hydrocarbon is treated in the presence of a hydrogen-containing gas, the temperature of treatment may be varied in the range of from about 350° F. to about 1250°

F.; a pressure of from about 1 atmosphere to about 4000 p.s.i.g.; a weight space velocity of about 0.01 to about 25 (w./hr./w). measured as the pounds of hydrocarbon charged to the treating zone per hour per pound of catalyst present therein.

Catalyst which may be used for the purpose of converting or treating hydrocarbon feed materials in the presence of hydrogen may be any one of the well known catalysts in the prior art such as for example, silica containing catalysts, including silica-alumina, platinum-alumina type catalysts used in reforming or hydroforming or desulfurization reactions may be conducted in the presence of chromia, molybdenum-trioxide, nickel-molybdate supported on alumina, or nickel-tungstate-alumina or cobalt-molybdate-alumina and nickel-cobalt-molybdate catalysts. In addition, the catalytic material may be any suitable desulfurization catalyst including those which are hydrogenation catalysts such that the sulfur impurities are either absorbed by the catalyst and/or hydrogenated to produce hydrogen sulfide, which is evolved as a product of the process. Other catalysts which also may be used for this purpose are, for example, platinum and/or palladium group catalysts supported on alumina-type carrier materials, a group VI metal compound including, for example, the oxide and/or sulfide of the left hand elements thereof, specifically chromia and/or molybdenum trioxide supported on alumina, the group VI metal compound may be promoted with a compound of a metal of group VIII including the oxides and/or sulfides of iron, cobalt and nickel.

The desulfurization reactions may employ temperatures in the range of from about 550° F. to about 1000° F., preferably from about 600° F. to about 800° F. a pressure of from about 25 to about 2000 p.s.i.g., preferably from about 300 to about 1000 p.s.i.g., a weight space velocity of from about .05 to about 20, preferably from about .5 to about 10. The hydrogen charged to the system may be from about 300 to about 20,000 standard cubic feet of hydrogen per barrel of hydrocarbon oil feed.

In the desulfurization process to which this invention is particularly directed, the hydrocarbons to be desulfurized include those referred to as straight run hydrocarbons or hydrocarbon products of cracking operation which include gasoline, naphtha, kerosene, gas oil, cycle stocks from catalytic cracking or thermal cracking operations, residual oils, thermal and coker distillates, etc. This also includes those special cuts of either straight run or catalytically cracked products which are referred to as cycle oil, stove oil, diesel fuels, etc. The sulfur concentration of these hydrocarbon stocks may vary from about .03 to about 10 percent by weight. It is also contemplated treating hydrocarbon stocks having a gravity of from about 20 to about 50 API and a sulfur concentration of from about 0.25 to about 6.0 percent by weight, such as for example, gas oil and light catalytically cracked cycle stock. It is also contemplated that the boiling range of the hydrocarbon feed to be desulfurized may vary from about 70 to about 800° F. and the end point may vary from about 250 to about 1050° F., at atmospheric pressure.

The desulfurization process employing the improved method of start up of this invention will operate with equal efficiency on any one or a combination of feed materials described herein. Table 1 below describes particular feed materials which may be successfully desulfurized in the process described herein. Furthermore, hydrogen-containing gases of varying purity may be successfully employed for starting up the desulfurization process, as well as effecting desulfurization of the hydrocarbon feed after the process is on stream. Table 2 below presents, for purposes of illustration, the composition of two different hydrogen-rich gas streams which may be successfully employed in the process of this invention. Of course, it is to be understood that other hydrogen-rich gas streams of different composition may also be successfully employed in the present invention.

*Table 1*

CHARGE STOCKS

| | Stove Oil | Diesel Base | FCC Light Cycle Oil |
|---|---|---|---|
| Gravity, ° API | 42.0 | 34.0 | 27.0 |
| Color, ASTM | 25 | 16 | |
| Flash, ° F | 125–150 | 140–200 | 140–200 |
| Sulfur, Wt. Percent | 0.8 | 1.5 | 2.0 |
| ASTM Distillation: | | | |
| IBP, ° F | 360 | 374 | 350 |
| 10% | 390 | 520 | 405 |
| 50% | 440 | 570 | 482 |
| 90% | 510 | 600 | 588 |
| FBP | 540 | 620 | 615 |

*Table 2*

FEED GAS COMPOSITIONS

| Mol Percent | Average Purity | Maximum Purity |
|---|---|---|
| $H_2$ | 84.9 | 93.7 |
| $C_1$ | 3.1 | 1.0 |
| $C_2$ | 2.1 | 0.7 |
| $H_2S$ | .8 | 0.8 |
| $C_3$ | 1.9 | 0.8 |
| $C_4$ | 4.8 | 2.0 |
| $C_5$ | 1.2 | 0.5 |
| $C_{6+}$ | 1.2 | 0.5 |
| Total | 100.0 | 100.0 |

In accordance with one embodiment, the desulfurization reactor is provided with a plurality of separate fixed catalyst beds within the reactor shell containing substantially equal quantities of catalyst in each bed amounting to from about 10 percent to about 20 percent of the total mass of catalyst within the reactor. By this arrangement, the particular feed to be treated may be passed in contact with any desired quantity or portion of the catalyst within the reactor under selected reaction conditions. In another embodiment, the reactor contains at least three catalyst beds with the two upper catalyst beds containing approximately equal quantities of catalyst in each bed and the lowermost bed containing a quantity of catalyst at least equal to the total quantity of catalyst in the remaining catalyst beds.

It is also contemplated within the scope of this invention to employ a plurality of separate catalyst beds in the reactor with each bed containing a different quantity of catalyst. In this embodiment, generally the quantity of catalyst in each catalyst bed will increase in the direction of flow of reactant material. The catalyst beds are retained as relatively fixed catalyst beds between suitable perforated grids or foraminous members which will permit flow of reactant material sequentially through the catalyst beds as desired in the reactor shell. Provisions are also made for introducing hydrocarbon feed material to any portion of the reactor and for introducing a suitable quench material such as a gas or oil which may be a recycle gas or oil between the catalyst beds to effect a means of temperature control of the reaction within desired limits. As previously indicated, provisions are made for introducing a desired hydrocarbon reactant feed material between any one of the catalyst beds for flow through a portion of the catalyst within the reactor chamber as desired while the hydrogen-rich gas is passed sequentially through the total mass of catalyst or catalyst beds within the reactor chamber. By this improved arrangement, a hydrocarbon reactant may be processed at space velocities in the range of from about 1 to about 10 times the space velocity of the total catalyst inventory under desired temperature and pressure conditions. Furthermore, by this arrangement dissimilar reactant materials may be contacted under varying severity conditions of operation. Moreover, this arrangement lends itself to a system of optimum flexibility and versatility for processing dissimilar hydrocarbon reactants, particularly for the desulfurization of sulfur-containing hydrocarbons. More specifically, a reactant material comprising a fluid catalytic cracking light cycle oil having a low API gravity of about 27° API or a diesel base feed material having an API gravity of about 34 may be desulfurized at a space velocity below about 3.4 w./hr./w. to remove at least about 90 percent of its sulfur content by passing the oil feed with the hydrogen through the total mass of catalyst in the reactor. However, a hydrocarbon feed material of higher API gravity of about 42° API such as a stove oil, may be effectively desulfurized without color change by passing the material in contact with only a desired portion of the catalyst mass for example about one-half or less than half of the total catalyst mass in the reactor, while the hydrogen-rich gas stream is passed through the total catalyst mass. Accordingly, the space velocity will be increased at least twice that employed when using the total quantity of catalyst in the reactor. In this latter arrangement the passage of the hydrogen-rich gas through the total mass of catalyst in the reactor prevents or excludes the passage of vapors from the higher API gravity material from entering into the remaining portion of the catalyst in the reactor. When treating a higher API gravity material in this manner an advantage is achieved during the desulfurization of the feed material in that the process may be carried out at much higher space velocity conditions above about 6.0 w./hr./w., such that there is no degradation of the feed color. Accordingly, the space velocity may be controlled over a wide range as hereinbefore indicated by introducing the feed or reactant material at various points of the total mass of catalyst within the reactor in order that the hydrocarbon feed passes through only the desired portion of the catalyst mass, while the hydrogen-rich stream passes through the total mass of catalyst within the reactor.

One of the primary advantages in the process design to which this invention is directed resides in the arrangement of steps for recovering heat from the reactor effluent in an efficient manner whereby savings in utilities are realized and use of costly alloys are greatly minimized. The use of expensive alloy surfaces in the reactor effluent heat exchange system has been held to a minimum by splitting the reactor effluent at the reactor outlet and employing one portion of the effluent to heat the oil feed stream with the other portion of the reactor effluent being employed to heat the recycle gas stream, as well as a portion of the condensed liquid passed to the stripper. By this novel and improved arrangement of steps, temperatures of the condensed liquid passed to the stripper are readily controlled over a desired range. Furthermore, the temperature of the first separator drum in the series may be controlled by the amount of heat removed from the effluent by the indirect heat exchanger in preheating the oil feed passed to the furnace. This particular arrangement of process steps also desirably facilitates starting up the process in accordance with this invention, as will become evident from the description presented herein.

In the process described herein the recycle gas is heated to an elevated temperature in the range of from about 500° F. to about 600° F., or higher by heat exchange with a portion of the reactor effluent, thereby eliminating the need of providing a suitable furnace for heating the hydrogen-rich gas stream passed to the reactor. This improved combination of steps and method for handling the reactor effluent permits operating under conditions whereby the total heat of the reactor effluent is efficiently utilized to preheat the hydrogen-rich gas and the oil feed, thereby avoiding the necessity of cooling the entire reactor effluent and eliminating the need for expensive and inefficient reheating of the oil passed to the stripper tower.

The stripper tower is maintained at an average temperature in the range of from about 300° F. to about 600° F., and a pressure in the range of from about atmospheric to about 100 p.s.i.g., wherein hydrogen sulfide in the desulfurized oil is removed under conditions to permit control of the ASTM initial boiling point of the hydrocarbon product. By using steam in the lower portion of the stripper tower, the use of expensive alloy reboilers are also eliminated. Furthermore, the lower temperatures employed in the stripper tower also substantially reduce the problems relating to degradation of product color by overheating.

Referring now to the drawing, by way of example, a hydrocarbon feed, such as a cycle oil obtained from a catalytic cracking operation having an API gravity of 27.0 and about 2 percent by weight of sulfur is passed by conduit 2 containing pump 4 to heat exchanger 6 wherein the oil feed is passed in indirect heat exchange with products of reaction, thereby raising the temperature of the feed to about 257° F. Thereafter, the oil feed is passed by conduit 8 to a second indirect heat exchanger 10 for indirect heat exchange with a portion of the reaction effluent stream to further elevate the temperature of the cycle oil feed to about 660° F. The cycle oil feed at this elevated temperature is then passed by conduit 12 to a furnace 14 wherein the cycle oil is further heated to an elevated temperature of from about 740° F. to about 800° F., depending upon the particular reactor outlet temperature desired. The thus heated cycle oil leaves furnace 14 by conduit 16 for introduction into the reaction zone 18. Hydrogen-rich gas which has been heated to an elevated temperature by the steps herein described is admixed with the cycle oil feed to be desulfurized in this particular instance prior to entering the reaction zone. In this particular embodiment the hydrogen-rich gases at an elevated temperature of about 600° F. are passed by conduit 20 for admixture with the cycle oil in conduit 16 to provide a mixture having a temperature of about 750° F., after which the mixture is then passed to the reactor 18 and in contact with a mass of desulfurizing catalyst therein. In this specific embodiment the reactor is provided with three separate catalyst beds in which the two upper beds have equal portions of catalyst therein and the lowermost bed has a quantity of catalyst at least equal to the total amount of catalyst in the upper two catalyst beds. The mixture of cycle oil and hydrogen is passed through the reactor in contact with finely divided cobalt-molybdena-alumina catalyst. This catalyst comprises approximately 2.5 percent by weight of cobalt oxide and about 14 percent by weight of molybdenum oxide with the remaining portion being alumina. The hydrogenation of the sulfur compounds to produce hydrogen sulfide involves both endothermic and exothermic reactions; consequently, depending upon the degree of hydrogenation there may be a temperature raise within the reactor due to exothermic reaction conditions. In order to control the reaction temperature within a desired range, provisions are made for introducing a suitable quench material between catalyst beds, such as for example a quench oil. The desulfurized product and entrained hydrogen-rich gas is then removed from the bottom of the reactor 18 by conduit 22 at an elevated temperature of about 800° F. This desulfurizing product effluent stream comprising hydrocarbon, hydrogen-rich gas and hydrogen sulfide is then separated into two streams such that a suitable portion of the product effluent stream is passed by conduit 24 to heat exchanger 26 wherein the temperature of the hydrogen-rich stream passed in indirect heat exchange therewith is heated to a suitably elevated temperature and the product effluent stream is reduced to a temperature of about 630° F.

The product or reactor effluent stream will comprise a vapor and liquid stream which is then passed by conduit 28 to heat exchanger 30 for additional cooling thereof and thereafter this stream is passed by conduit 32 to separation drum 34. The remaining portion of the product effluent stream recovered from the reactor is passed by conduit 36 to heat exchanger 10 in indirect heat exchange with the hydrocarbon feed passed to the furnace whereby heat is given up to the hydrocarbon feed and thereafter the thus cooled reactor effluent stream is passed by conduit 38 and mixed with the remaining portion of the reactor effluent prior to being introduced into the separation drum 34. Separation drum 34 is maintained at a pressure of about 867 p.s.i.g. and a temperature of about 450° F. In separation drum 34 a gaseous stream comprising about 59.2 mol percent hydrogen and 18.8 mol percent hydrogen sulfide is withdrawn by conduit 39, passed to heat exchanger 40 wherein the temperature of the stream is reduced to about 332° F. and the thus cooled stream is then passed by conduit 41 to cooler 42 to suitably reduce the temperature of the stream such that this material upon passage by conduit 44 to separation drum 46 will permit maintaining the temperature of separation drum 46 at about 125° F. and a pressure of about 850 p.s.i.g. In separation drum 46 a vaporous stream comprising 68 mol percent hydrogen and 19.4 mol percent hydrogen sulfide is withdrawn by conduit 48 and passed to a suitable treating step, not shown, for the separation of hydrogen sulfide from a hydrogen-rich gas stream such that the hydrogen-rich gas stream may be reused in the process. In separation drum 34 a liquid stream is withdrawn by conduit 50 and passed to steam stripping tower 52. A liquid stream amounting to a minor portion of the total desulfurized product stream is withdrawn from separation drum 46 by conduit 54 and passed to heat exchanger 30 wherein the temperature of this minor stream is elevated to about 405° F. Thereafter, this stream at an elevated temperature is passed by conduit 56 for admixture with the remaining liquid product effluent in conduit 50 and passed to the steam stripper 52. The combined streams at a temperature of about 435° F. are then passed to the steam stripping tower for separation of desulfurized product from the remaining portion of the product effluent stream. In the steam stripper 52 steam at a temperature of about 450° F. and a pressure of about 175 p.s.i.g. is introduced to the bottom of the tower by conduit 58. In the stripping tower 52 unstabilized gasoline and gaseous material are stripped from the desulfurized product and removed from the top of the tower by conduit 60 at a temperature of about 277° F. This stream containing steam and hydrocarbons is passed by conduit 60 to a cooler 62 and conduit 64 to separating drum 66 maintained at a temperature of about 90° F. and a pressure of about 15 p.s.i.g. In separating drum 66 unstabilized gasoline product is separated from a gaseous product and removed therefrom by conduit 68 containing pump 70. This recovery liquid stream is then split such that a portion is passed by conduit 72 as reflux to the tower with the remaining portion of this stream being withdrawn by conduit 74. The gaseous product is recovered from separation drum 66 by conduit 76 and may be passed to suitable recovery equipment, not shown, to obtain a suitable gaseous material which may be used in the process. Referring back now to the stripper, the stripped desulfurized product is withdrawn from the bottom of the stripping tower by conduit 80 at a temperature of about 360° F. and passed to heat exchanger 6 wherein the temperature is reduced to about 250° F. by being passed in indirect heat exchange with oil feed material. Provisions are also made for bypassing heat exchanger 6 with desulfurized product withdrawn from the bottom of the stripper. Thereafter, the desulfurized product is passed by conduit 82 to cooler 84 to reduce the temperature to about 100° F. and the thus cooled desulfurized product is then passed by conduit 86 containing pump 88 to a suitable dryer 94 by conduit 90 or the desulfurized product may bypass dryer 94 and be withdrawn as product of the process by conduit 92. Hydrogen-rich gas containing about 85 mol percent hydrogen and about 1.9 mol percent hydrogen sulfide is admixed with hydrogen-rich recycle gas to provide a hydrogen stream comprising about 72.3 percent hydrogen. This stream is then passed by conduit 100 containing pump 101 and at a temperature of about 150° F. and a pressure of about 1010 p.s.i.g. to heat exchanger 40 wherein the temperature of the hydrogen-rich gas is raised by indirect heat exchange to a temperature of about 400° F. The thus heated hydrogen-rich gas is passed by conduit 102 to indirect heat exchanger 26 for further heating of this gas stream to an elevated temperature of about 600° F. with product effluent in conduit 24. The thus heated hydrogen-rich gas is then passed directly by conduit 20 to reactor 18 as hereinbefore discussed without further heating.

Provisions are also made in the process of this invention for treating a different hydrocarbon feed material, such as, for example, a stove oil under desulfurizing conditions without degradation of color. In this particular embodiment the stove oil to be desulfurized is passed through only a portion of the total mass of catalyst in the reactor with the hydrogen being passed through the total mass of catalyst in the reactor. This particular arrangement is provided by closing valve 104 and passing the stove oil feed through conduit 106 containing valves 108. By this particular method of operation, the hydrogen-rich gas passes continuously through the total mass of catalyst keeping it substantially clear of hydrocarbon vapors, as well as effecting a partial regeneration of this portion of the catalyst beds simultaneously with effecting desulfurization of the stove oil feed in the lower portion of the reactor. The products of reaction are removed from the bottom of reactor 18 by conduit 22 and handled in a similar manner, as hereinbefore described.

Table 3 below presents the results obtained when treating a light cycle oil feed described in Table 1 in accordance with an embodiment of this invention.

Table 4 below presents the results obtained when treating a stove oil feed described in Table 1.

MATERIAL BALANCES

*Table 3*

MATERIAL BALANCE—FCC LIGHT CYCLE OIL FEED

|  | Feed | | Gas | Products | |
|---|---|---|---|---|---|
|  | Cycle Oil | Feed Gas | | Gasoline | Prod. Oil |
| Vol. Percent on feed | 100.0 | | | 5.0 | 95.0 |
| B.p.s.d | 8,000 | | | 400 | 7,590 |
| °API | 27.0 | | | 37.8 | 28.5 |
| Lb./gal | 7.43 | | | 6.96 | 7.36 |
| G.p.h | 14,000 | | | 700 | 13,260 |
| Lb./hr | 104,000 | 3,080 | 4,594 | 4,877 | 97,609 |
| Sulfur, Wt. Percent | 2.0 | | | 0.2 | 0.2 |
| Sulfur, lb./hr | 2,080 | | 1,921 | 1 | 158 |
| S.c.f.b | | 400 | 168 | | |

*Table 4*

MATERIAL BALANCE—STOVE OIL FEED

|  | Feed | | Gas | Products | |
|---|---|---|---|---|---|
|  | Stove Oil | Feed Gas | | Gasoline | Prod. Oil |
| Vol. Percent on feed | 100.0 | | | 3.0 | 96.9 |
| B.p.s.d | 8,000 | | | 258 | 7,750 |
| °API | 42.0 | | | 50.0 | 43.0 |
| Lb./gal | 6.79 | | | 6.49 | 6.75 |
| G.p.h | 14,000 | | | 451 | 13,550 |
| Lb./hr | 95,000 | 1,269 | 1,836 | 2,927 | 91,506 |
| Sulfur, Wt. Percent | 0.8 | | | .02 | .07 |
| Sulfur, lb./hr | 760 | | 693 | 1 | 61 |
| S.c.f.b | | 165 | 90 | | |

In accordance with the improved method of start-up of this invention as applied to the desulfurized process herein described, a bypass conduit 49 with suitable valve means is provided for recycling hydrogen-rich gas recovered from drum 46 by conduit 48 and conduit 49 to the inlet side of pump 102 in conduit 100. To provide for cyclic flow of the oil feed through the system until desired operating temperatures are attained, conduit 87 containing suitable valve means permits recycling the oil from pump 88 in conduit 86 to the suction side of pump 4 in conduit 2. Provision is also made by conduit 13 for passing a portion of the oil feed material as the system is being brought up to temperature from conduit 12 directly to conduit 54 and exchanger 30 to protect the exchanger during start-up, as well as to permit circulation of feed material through the stripper until the desired operating conditions are obtained. The flow through conduit 13 and exchanger 30 is maintained until a level is established in separator 46 and a flow is initiated through conduit 54 to exchanger 30.

As a specific example of the improved method of start-up in accordance with this invention, reference is had to the drawing and the following sequence of steps.

(1) Establish hydrogen-rich gas circulation through compressor 101, conduit 100 to heat exchanger 40, conduit 102 to heat exchanger 26, conduit 20 to reactor 18, split the hydrogen-rich gas discharged from the reactor by conduit 22 such that it passes through heat exchangers 26, 30 and 10. Thereafter, the hydrogen-rich gas stream in conduits 38 and 32 is combined and passed to separating drum 34. From separating drum 34, the gas stream passes by conduit 39 to heat exchanger 40; conduit 41 to cooler 42 and conduit 44 to separation drum 46. From separation drum 46 hydrogen-rich gas is recovered by conduit 48 and passes by conduit 49 to the suction side of compressor 101, thus completing a cyclic circuit in the system. This cyclic circuit of the hydrogen-rich gas stream is continued and pressure built up in the system until the pressure in separation drum 46 reaches a pressure of about 850 p.s.i.g. in 100 p.s.i. increments.

(2) When the system pressure is established and checked to be sure that there are no leaks, the relatively cool oil at ambient temperature conditions or as received from storage or other source is then started to the unit. The oil flow is initiated by pump 4 which passes the oil by conduit 2 to heat exchanger 6 and conduit 8 to heat exchanger 10. Thereafter the oil is passed by conduit 12 to furnace 14. The oil feed is passed through the furnace without heating and conduit 16 for admixture with the hydrogen-rich gas in conduit 20 being passed to reactor 18. Thereafter the oil in admixture with the hydrogen gas is passed through heat exchangers 26, 30 and 10, similarly as described above with respect to the hydrogen-rich gas stream flow to separation drum 34. In separation drum 34 hydrogen-rich gas and liquid will separate and when a suitable level is established, flow of liquid to the stripper will be initiated. The oil flow will be continued until a suitable level accumulates in stripper 52 and thereafter pump 88 will be started whereby the oil passed from stripper 52 to pump 88 by conduits 80, 82 and 86 will permit passage of the oil through bypass 87 to the suction side of pump 4 thereby completing the cyclic circulation of the oil feed. At this time oil flow through exchanger 30 is initiated by passage of a portion of the oil in conduit 12 by conduit 13 into conduit 54 leading to heat exchanger 30. This material will then pass by conduit 56 to the stripper.

(3) After establishing the cyclic flow of the hydrogen-rich gas and oil feed through the system at a fraction of the design feed rate and about one half of design oil feed rate, furnace 14 is fired and the temperature of the system is raised at a moderate rate not to exceed a temperature rise at the furnace outlet of about 100° F. per hour until a temperature of about 800° F. is attained at the furnace effluent. This furnace effluent temperature of 800° F. is maintained until the reactor temperature is about 700° F.

(4) When a sufficient liquid level accumulates in separator 46 such that liquid flow by conduit 54 to heat exchanger 30 may be initiated, the flow previously established through conduit 13 is stopped in this bypass start-up line. When the temperatures start to increase in the reactor, the feed gas make-up will also increase and it will be necessary to set flow controllers in the net off gas line at a rate sufficient to maintain the recycle gas quality.

(5) After the system reaches a temperature at which desulfurization of the oil feed takes place under reduced flow conditions, discontinue the cyclic circulation of the oil recovered from the bottom of the stripper and divert the desulfurized oil to drier 94 or storage.

(6) Raise the oil feed flow to design rate.

(7) Adjust recycle gas flow to desired gas to oil ratios and adjust temperature conditions for desired sulfur removal.

Having thus given a general description of this invention and presented specific examples thereof, it is to be understood that obvious modifications may be made thereto without departing from the spirit thereof.

I claim:

1. A method for starting up a process for desulfurizing a hydrocarbon feed material in the presence of hydrogen-rich gaseous material which comprises establishing circulation of hydrogen-rich gaseous material in a desulfurization process at ambient temperature conditions, raising the pressure of the circulating hydrogen-rich gas stream to a pressure sufficient to provide flow of hydrocarbon feed material to be desulfurized, thereafter introducing hydrocarbon feed to the process without heating thereof and establishing circulation of the hydrocarbon feed in the process at substantially ambient temperature conditions and thereafter gradually heating the hydrocarbon feed until desired desulfurizing conditions are established.

2. A method for starting up a process employing a preheat furnace zone, a reactor zone containing catalytic material and product recovery steps wherein a hydrocarbon material is treated with a hydrogen-rich gaseous material which comprises establishing circulation of hydrogen-rich gaseous material through the reactor zone and product recovery steps, raising the pressure of the circulating hydrogen-rich gaseous material until desired pressure conditions are established in the process, thereafter establishing circulation of hydrocarbon material at ambient temperature conditions through the furnace zone, reactor zone and product recovery steps, continuing the cyclic circulation of the hydrogen-rich gaseous material and hydrocarbon feed material while gradually raising the temperature of the process to desired operating temperature conditions by incrementally adding heat by the furnace zone to the circulating hydrocarbon material and after desired temperature conditions are established in the process terminating the circulation of hydrocarbon material by recovery of products of said process.

3. A method for starting up a process for the treatment of hydrocarbon feed material in the presence of hydrogen-rich gaseous material employing a preheat zone, a reactor zone containing catalytic material, at least two separating zones in series and a stripping zone which comprises establishing circulation of relatively cool hydrogen-rich gases through the process including the reaction zone, the separation zones in series and back to the reactor zone; increasing the pressure of the circulating hydrogen-rich gas until a desired pressure is obtained in the process, thereafter establishing cyclic flow of hydrocarbon feed material without the addition of heat thereto through the process including the preheat zone, the reactor zone, the separation zones, the stripping zone and back to the preheat zone; after circulation of hydrocarbon material is established in the process gradually raising the temperature of the circulating streams by incrementally raising the temperature of the hydrocarbon material passed through the preheat zone and terminating the circulation of the hydrocarbon material from the stripping zone to the preheat zone when desired temperature conditions are attained in the process to recover desired products of said treating step.

4. The process of claim 3 wherein the temperature of the hydrocarbon feed material is raised at a rate not to exceed about 100° F. per hour.

5. In a process for desulfurizing a hydrocarbon feed material in the presence of hydrogen-rich gases, the improved method of starting up the process which comprises circulating hydrogen-rich gas without the addition of heat thereto through the system comprising a reaction zone containing catalytic material therein, a product effluent heat exchange train, at least two sequentially connected separation zones and back to the reaction zone, establishing sufficient pressure with the circulating hydrogen-rich gas to assure flow of hydrocarbon feed material hereinafter introduced to the process, thereafter circulating hydrocarbon feed without the addition of heat thereto through the system comprising a feed preheat furnace, the reactor zone, the product effluent heat exchange train, the sequentially connected separation zones, a stripping zone and back to the preheat furnace zone, when desired flow of hydrocarbon feed material is established in the process gradually raising the temperature of the circulating hydrogen-rich gases and the hydrocarbon feed by incrementally raising the temperature of the furnace zone employed to heat the hydrocarbon feed, and when desired desulfurizing temperature conditions are attained in the process, terminating the flow of the hydrocarbon feed material from the stripper to the furnace zone for the recovery of desulfurized products from the process.

6. The process of claim 5 wherein the flow rate of the hydrocarbon feed employed during heat-up of the process is a portion of the total flow rate employed under desired desulfurizing conditions.

7. The process of claim 5 wherein the hydrogen-rich gases and hydrocarbon feed pass through the total mass of catalytic material in the reaction zone.

8. The process of claim 5 wherein the hydrogen-rich gases pass through the total mass of catalytic material and the hydrocarbon feed passes through only a portion of the catalytic material in the reaction zone.

9. The process of claim 5 wherein the temperature of the hydrocarbon feed is incrementally raised at a rate of about 60° F. per hour.

10. The process of claim 5 wherein the reactor heat exchange train is formed by splitting the reactor effluent into a first and second stream with the first stream being passed in indirect heat exchange with hydrogen-rich gases passed to the reactor zone and a liquid product stream recovered in one of said separation zones and the second stream is passed in indirect heat exchange with the hydrocarbon feed material passed to said furnace zone.

11. The process of claim 10 wherein during start-up a portion of hydrocarbon feed material recovered from the heat exchanger in the second stream is passed through the liquid product heat exchanger in the first stream until sufficient liquid is recovered from said separation zone for flow thereto.

12. The process of claim 10 wherein hydrocarbon feed is passed in indirect heat exchange with liquid recovered from the bottom of said stripper zone prior to being passed in indirect heat exchange with said second stream.

13. The process of claim 10 wherein hydrogen-rich gas is passed in indirect heat exchange with vaporous material passed from said first separation zone to said second separation zone and prior to passing in indirect heat exchange with said first stream.

14. The process of claim 10 wherein the temperature of the hydrocarbon feed recovered from the furnace is not to exceed about 850° F.

15. A method for starting up a process including a hydrocarbon feed preheat zone and a reaction zone containing catalytic material therein which comprises establishing circulation of gaseous material through the process including the reaction zone without passing through the hydrocarbon feed preheat zone, raising the pressure of the circulating gaseous material until a desired operating pressure is obtained in the process, when the desired operating pressure is established in the process introducing relatively cold hydrocarbon feed material to the process and establishing circulation of the relatively cold hydrocarbon feed such that it passes through the preheat zone in a relatively cold condition, the reaction zone and is returned to the preheat zone, and thereafter gradually raising the temperature of the catalytic material in the reaction zone by gradually raising the temperature of the circulating hydrocarbon feed material passed through the feed preheat zone.

16. The method of claim 15 wherein the temperature of the hydrocarbon feed material is raised at a rate not to exceed about 100° F. per hour.

References Cited in the file of this patent

UNITED STATES PATENTS

| | | |
|---|---|---|
| 1,780,873 | Frankfurter | Nov. 4, 1930 |
| 2,840,513 | Nathan | June 24, 1958 |
| 2,877,099 | Bowles | Mar. 10, 1959 |